July 13, 1943.  A. C. PFAU ET AL  2,324,019
WORK CABINET
Filed May 18, 1942  3 Sheets-Sheet 1

ALFRED C. PFAU
JOHN G. LISKOW
INVENTORS.

BY Arthur F. Robert
ATTORNEY.

July 13, 1943.  A. C. PFAU ET AL  2,324,019
WORK CABINET
Filed May 18, 1942  3 Sheets-Sheet 3

ALFRED C. PFAU
JOHN G. LISKOW
INVENTORS

BY Arthur J. Robert
ATTORNEY

Patented July 13, 1943

2,324,019

UNITED STATES PATENT OFFICE 2,324,019

WORK CABINET

Alfred C. Pfau, Jeffersonville, Ind., and John G. Liskow, Louisville, Ky., assignors to American Air Filter Company, Inc., Louisville, Ky., a corporation of Delaware Application May 18, 1942, Serial No. 443,388

5 Claims. (Cl. 51—273)

This invention relates to work cabinets, and more particularly to work cabinets for grinding and otherwise machining workpieces embodying means for removing the dust-laden air incident to such machining, separating the dust and air, and returning the cleaned air to the ambient atmosphere.

Grinding wheels or like machines in combination with suction means for the removal of dust-laden air incident to the grinding operation are well known. Such arrangements as heretofore employed have been relatively small and adapted for the machining of small articles adapted to be held in the hand such as lathe tools and the like. A different problem has been encountered in the grinding or machining of larger articles such as airplane propeller sections where the article is large and awkward and must be supported on a suitable workholder, not only because of its size but to also insure accuracy in the work being performed thereon. A simple suction hood covering the entire work-piece is not satisfactory because of the large size required and the consequent inefficiency. The grinding or like operation takes place over only a small localized portion of the surface of the workpiece at any one time. Hence the suction induced through the non-adjacent portions of the hood is not only wasted but also weakening of the suction effective in the working region. Consequently suction means of great capacity is required to effect the desired suction throughout the hood. Furthermore, such hoods wil not efficienty remove the dust collected in the interior of a hollow workpiece such as an airplane propeller section which has a hollow hub and in its initial stages of manufacture has one side open. The dust tends to pocket in the interior of the section and cannot be removed by the conventional suction hood.

In overcoming the aforesaid disadvantages, it is a major object of this invention to provide a novel work cabinet wherein work pieces of relatively large size may be positioned for local machining, the cabinet embodying means whereby the dust incident to such machining can be most efficiently and completely removed from the workpiece, separated from the air in which it is collected, and the latter returned in clean form to the ambient atmosphere.

A further object of this invention is the provision of a novel work cabinet wherein workpieces of relatively large size may be positioned for local machining and embodying suction means for removing the dust incident to the machining including means whereby the effect of the suction may be adjusted to suit the characteristics of the workpiece and the position of the operation thereon.

The present invention contemplates a work cabinet having means for supporting relatively large workpieces such as propeller blade sections for local grinding and like machining operations. To remove the dust incident to the machining operation which may take place at any one and all of a number of points, suction outlets are embodied in the cabinet in combination with means to vary the positions and the size of such outlets. At least one of such outlets is arranged to be selectively effective upon the interior of the workpiece, if the latter be hollow, so that any dust collected within the workpiece can be removed. The dust and air thus removed from the workpiece are separated and the air filtered and returned to the ambient atmosphere, the means for separating and filtering being compactly contained within the cabinet to provide a unitary whole.

Figure 1:
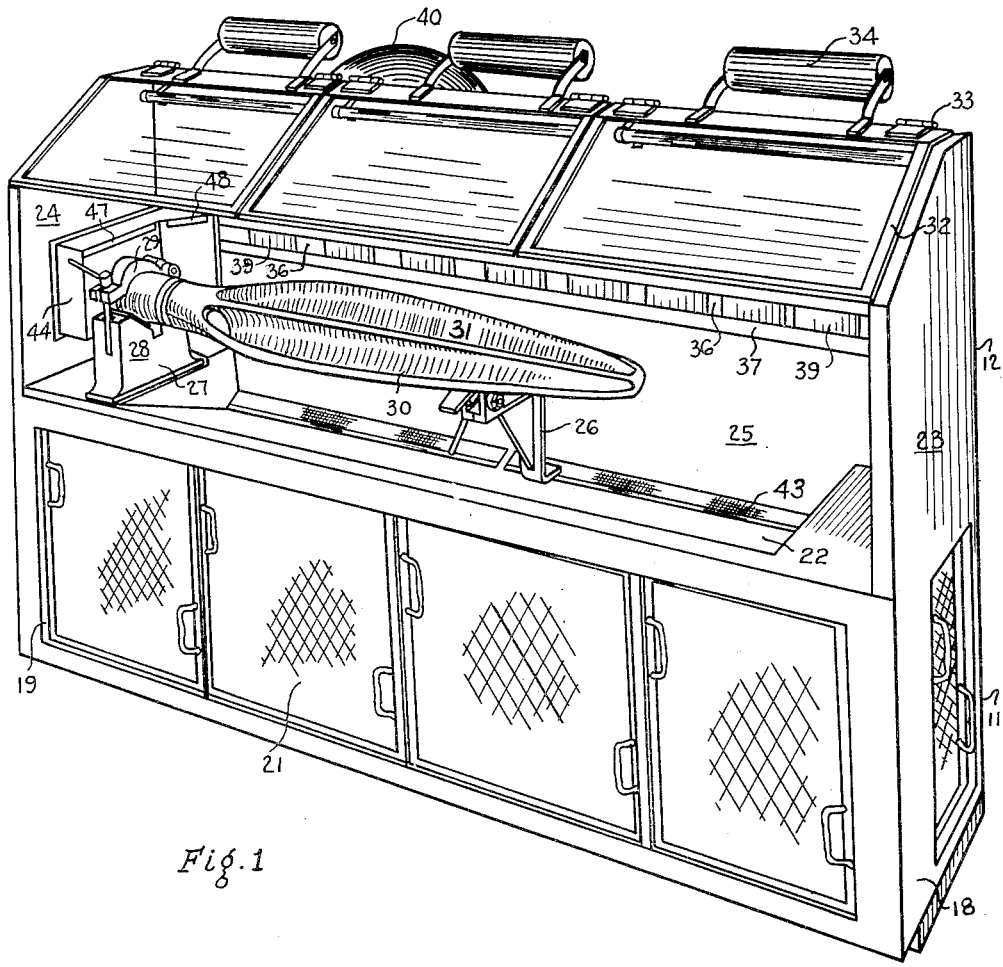
Figure 1 is a perspective of a work cabinet embodying the present invention, the cabinet being illustrated with a propeller section therein.
Figure 2:
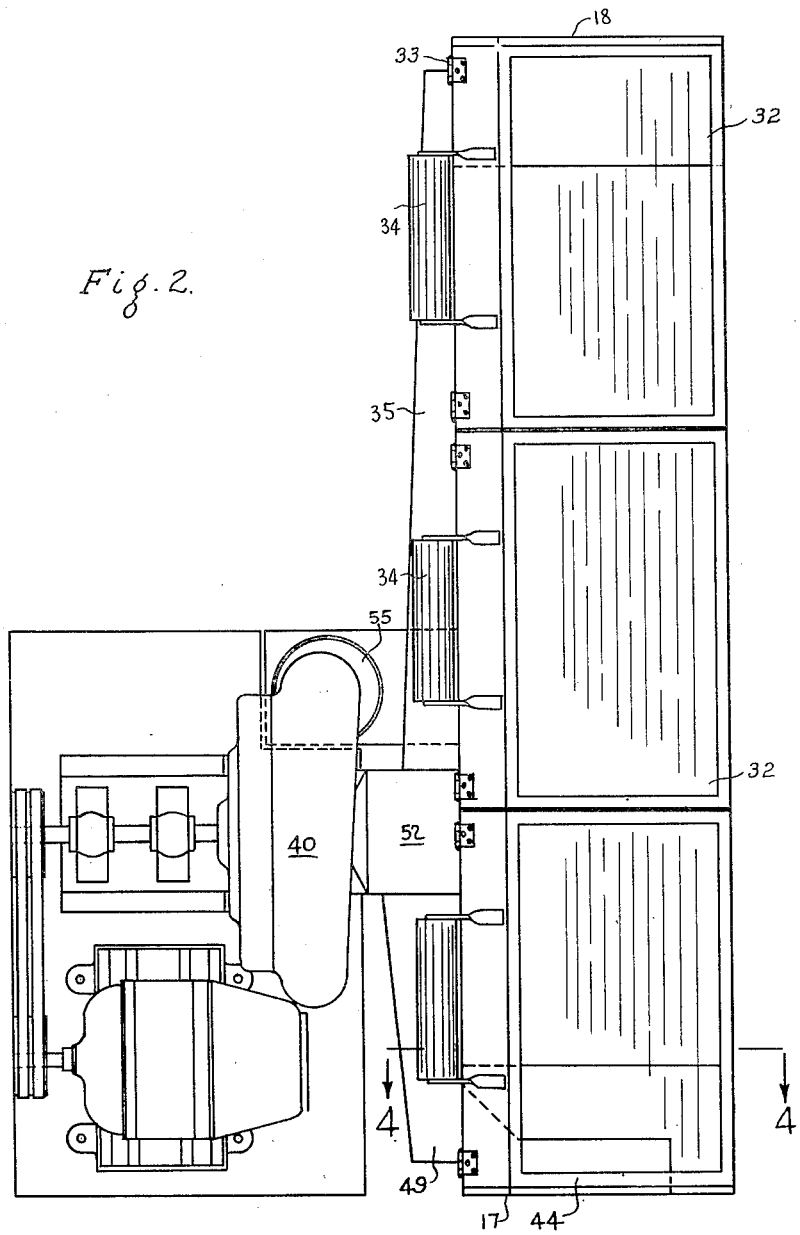
Figure 2 is a plan of the cabinet of Figure 1.
Figure 3:
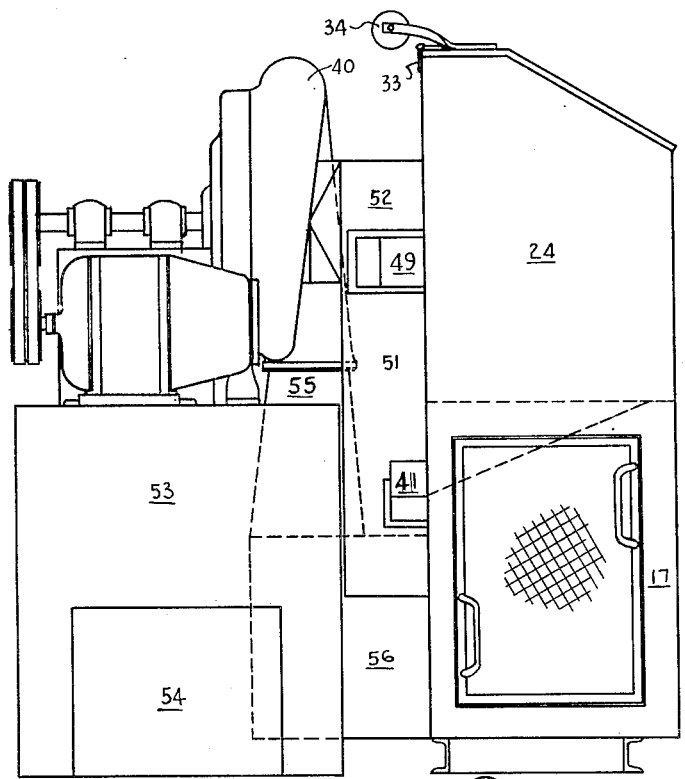
Figure 3 is an end elevation taken from the left end of the cabinet as viewed in Figure 1.
Figure 4:
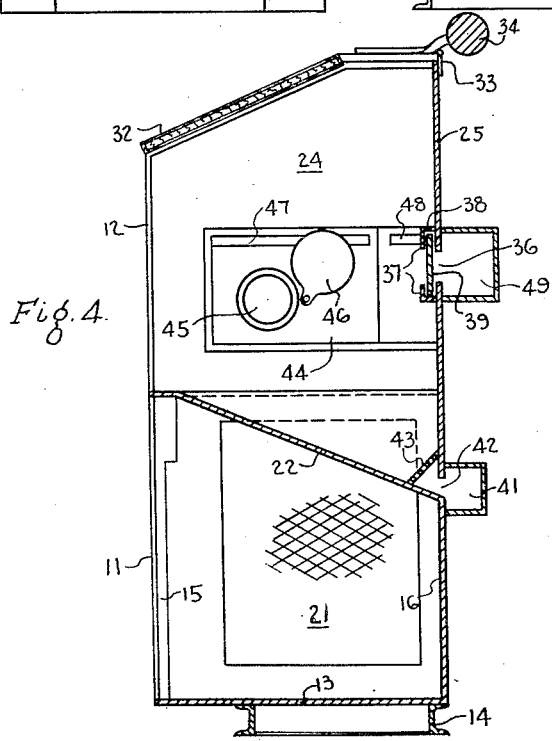
Figure 4 is a section taken on the line 4—4 of Figure 2 illustrating the arrangement provided at the end of the cabinet for removing the dust from hollow open-ended articles.

In the drawings, the cabinet therein shown comprises a lower section 11 and an upper section 12. The lower section is formed as a closed compartment having a bottom 13, preferably spaced from the floor by channels 14, a front wall 15, a rear wall 16, and end walls 17 and 18. The lower section rear wall 16 is preferably but the front and end walls are provided with apertures 19 for the reception of air filters of the unit type generally disclosed in Patent No. 1,788,171 to J. J. Preble, issued January 6, 1931. The top of the lower section 11 is preferably closed by a plate 22 inclined downwardly from the front of the cabinet to the rear for a purpose to be later explained.

The upper section 12 of the cabinet includes side walls 23 and 24 and a rear wall 25. An adjustable work support 26 is provided adjacent the center of the upper section. As the details of this support form no part of the present invention, they will not be described. A second support 27 is provided adjacent end wall 24, preferably embodying a member 28 having a V-shaped recess and a clamp 29 arranged to secure the workpiece in position. The workpiece herein shown at 30, by way of illustration, is an airplane propeller section which has a hollow hub and an open side during this stage of manufacture as shown at 31.

To protect the workman who stands at the open side of the cabinet and permit his observing the work without danger, a plurality of glass containing frames 32 are provided atop upper section 12 and hinged thereto at 33. Counterweights 34 or equivalent spring means are preferably provided on each of the glass frames so that they may be quickly rotated about hinges 33 to place them either in or out of working position.

Suction conduits 35 and 49 are provided on rear wall 25 of the upper section over a suction area in the form of slot 36 extending substantially parallel to the axis of the workpiece substantially from one end of the cabinet to the other. A pair of guides 37 are suitably secured to the inner surface of wall 25, along the edges of slot 36 to form longitudinally extending guideways 38 for individually slidable plates 39. With this arrangement, when suction is applied to conduits 35 and 49, plates 39 may be adjusted in guides 38 to control the application of the suction to any desired region within the cabinet adjacent slot 36 and provide any gradient of suction that may be desired. This arrangement is of advantage as compared to an otherwise fully open slot in that it affords means whereby the suction may be concentrated adjacent the region at which the grinding wheel or the machine tool is being used, thereby removing the necessity for an extraordinarily large air pump and enabling a fan of relatively small capacity to be used.

A second suction conduit 41 is provided on the rear wall of the cabinet adjacent a slot 42 formed by the adjacent edges of upper and lower rear walls 25 and 16 and extending substantially from one end of the cabinet to the other. Slot 42 is preferably of narrow width so that the effect of the suction will be concentrated immediately adjacent the surface of the lower end of inclined plate 22. Immediately above slot 42, a screen 43 is provided extending the full length of the slot. The inclined plate 22 functions to collect heavy particles falling from the workpiece, the particles of large size being caught by screen 43. Any dust collecting on or about plate 22 slides downwardly through screen 43 into slot 42 and is removed from the cabinet.

The upper section end wall 24 is provided with a conduit 44 on its interior, this conduit having an opening 45 which is positioned to substantially align with the open end of the workpiece, if the latter has an open end, a valve 46 being preferably provided to enable opening 45 to be closed when it is not in use. Slots 47 and 48 are provided adjacent the top of suction conduit 44 for the removal of dust particles in that region of the cabinet.

A dust separator 40, preferably of the Roto-Clone type, which is generally shown and described in Patent No. 1,941,449 to S. G. Sylvan of January 2, 1934, is provided at the rear of the cabinet. The separator 40 has an inlet conduit 52 projecting toward upper rear wall 25 where it connects with three other conduits namely 35, 49 and 51. The separator thus communicates: through conduit 35 with one section of slot 36; through conduit 49 not only with another section of slot 36 but also with conduit 44 leading to opening 45 and to slots 47 and 48; and through conduit 51 with conduit 41 leading to slot 42 which is covered by screen 43. Preferably conduits 35, 41, 49 are tapered as shown to secure uniform suction throughout their lengths.

The dust and air collected in separator inlet 52 enter the separator, the major portion of the dust including the larger particles thereof being separated from the air and delivered into a dust collector 53 having a suitable cleanout door 54. The relatively clean air is returned through conduits 55 and 56 to the interior of lower section 11 of the cabinet where it passes out through filter units 21 into the ambient atmosphere. By reason of the dust separator and the subsequent filtering through units 21, the air returned to the atmosphere is substantially dust free.

Having described our invention, we claim:

1. A work cabinet for the machining of relatively elongate workpieces such as propeller blade sections comprising: a housing having a work space to receive a workpiece and a front opening providing working access to said space; work supports in said space for the workpiece; suction means communicating with the rear of said work space to draw air over the workpiece and remove the air together with the dust incident to a local machining operation on the workpiece; and manually adjustable means for shifting the location of the suction communication with said work space over a range of positions enabling the location to be varied in accordance with variations in the location of a machining operation on the workpiece.

2. A work cabinet for the machining of relatively elongate workpieces such as propeller blade sections comprising: a housing having a work space to receive a workpiece, a front opening providing working access to said space, and a suction communication area at the rear of the work space paralleling the workpiece substantially throughout its extent; work supports in said space for the workpiece; suction means communicating through the suction area with the rear of said work space to draw air over the workpiece and remove the air together with the dust incident to a local machining operation on the workpiece; and means controlling the suction communication through the suction area, said means being manually operable selectively to limit communication to one or more sections of the area and to shift the communication from one section to another so as to enable its location in the area to be varied in accordance with variations in the location of a machining operation on the workpiece.

3. A work cabinet defined in claim 2 wherein: the suction communication area is in the form of a slot; and the control means is in the form of a number of plates mounted on the housing along the length of the slot for selective movement relatively to the slot to limit and shift suction communication through the slot.

4. A work cabinet for the machining of relatively elongate workpieces such as propeller blade sections comprising: a housing having a work space to receive a workpiece, a front opening providing working access to said space and a wall at the rear of the work space containing a suction slot paralleling the workpiece substantially throughout its extent; work supports in said space for the workpiece; suction means communicating through the slot with the rear of said work space to draw air over the workpiece and remove the air together with the dust incident to a local machining operation on the workpiece; and a number of plates distributed along and extending across the slot, each plate being slidably mounted on said rear wall for manual movement along the slot from one position in which it cooperates with an adjacent plate to close the slot sections occupied by both plates to a range of other positions in which it cooperates with the adjacent plate to define between plates a suction opening of controlled size.

5. A work cabinet for the machining of relatively elongate workpieces such as propeller blade sections comprising: cabinet means providing an upper machining section having a work space and a front opening providing working access thereto, a lower air filtering section having a space for receiving air and side wall openings for discharging the air to atmosphere, and a dust collecting section; work supports in said work space for the workpiece; conduits connected to the rear and end wall of the machining section, said walls being formed with apertures connecting the conduits to the work space; means to vary the position and number of said apertures; suction means operative to draw air and dust from the work space through the conduits, separate the major portion of the dust and air, deliver the dust to the dust collecting section and deliver the air to the receiving space of the filtering section; and filter units in the discharge openings of the filtering section to filter the air as it discharges to atmosphere.

ALFRED C. PFAU.
JOHN G. LISKOW.